INVENTORS
HARUO TAKENAKA
TEPPEI IKEDA
KATSUHARU FURUKAWA

ATTORNEYS

United States Patent Office 3,558,315
Patented Jan. 26, 1971

3,558,315
EDGE-FOG-PREVENTION METHOD FOR PHOTOGRAPHIC LIGHT-SENSITIVE FILMS
Haruo Takenaka, Teppei Ikeda, and Katsuharu Furukawa, Minami-Ashigara-machi, Japan, assignors to Fuji Shashin Film Kabushiki Kaisha, Kanagawa, Japan
Filed Aug. 31, 1967, Ser. No. 664,662
Claims priority, application Japan, Aug. 31, 1966, 41/57,487
Int. Cl. G03c 1/84, 3/02
U.S. Cl. 96—78     7 Claims

ABSTRACT OF THE DISCLOSURE

By forming continuous or intermittent nicks or narrow grooves in the opposite edge areas of a photographic light-sensitive film and pouring a dye or pigment in the nicks or grooves, the formation of edge fog can be prevented.

BACKGROUND OF THE INVENTION

(1) Field of the invention

The present invention relates to an edge-fog-prevention method for photographic light-sensitive films, packed in spools or magazines, by light entering through a portion of the film positioned at the outside of the spools or magazines (hereinafter simply called magazines). More particularly, the invention relates to a fog-prevention method for photographic light-sensitive films comprising forming nicks or fine grooves in the blank portions or edge portions of the film other than image-areas.

(2) Description of the prior art

In general, a photographic rolled film or photographic film for a magazine is prepared by slitting and cutting a long and wide photographic film. By slitting is meant that the wide film is slit into narrow films of, e.g., 35 mm. and 60 mm. in width and by cutting is meant that a long film, thus slit, is cut into length of, e.g., 104 cm., 83 cm., etc. By slitting or cutting a film, fresh edges of film are formed and the cut edges include the side sections of the film.

When a magazine containing photographic film is loaded in or unloaded from a camera, the photographic film packed in the magazine is frequently remarkably fogged by light entering through the film support from the side sections of the end of the film which is outside the magazine.

When a rolled film is treated in a similar way, light enters the spool through the space between the film leader and a light-shielding paper or between the edge of the film and a flange of the spool, whereby the light enters the inside of the film through the side section of the film which is exposed to the light. Or, if a camera has a mechanical defect, the edge of the film may protrude beyond the protective plates of the flanges at the opposite sides of the spool and the same phenomena as above will occur. In such a case, if the intensity of the entering light is high, it sometimes happens that about 50% of the image area of the film in the camera is fogged. The light entering the inside of the film support through the side sections of the film passes through the support by transmission in parallel with the opposite planes of the film or by repeating total reflections at the opposite planes of the film, or is absorbed by the film support, if the support has an optical density, or is refracted at the planes of the film and enters an emulsion layer or other coating layers coated on the surface of the film. Therefore, if the light is transmitted effectively through the support, fogs are formed markedly, even at the image areas. This phenomenon is called the fogging or end fogging. Such a phenomenon has a bad influence on photography.

As a method for preventing the formation of edge fog, a method has been proposed in which a light-scattering material is incorporated in film supports, whereby a phenomenon of light scattering is utilized. Also, a method is known to be effective in which a film support is dyed.

However, since the above-proposed methods reduce the transparency of film supports, they have a bad influence on the printing procedure of the film onto a cinefilm or a positive light-sensitive film or paper.

Further, a method has also been proposed in which the side sections of a film are coated with a solution of a dye capable of preventing the transmittance of light, but such a method is not sufficient since the coated layer may be stripped by being rubbed against the flanges of the spool in a high speed photographic or winding operation.

Therefore, an object of the persent invention is to provide a method of preventing the formation of edge fogging in photographic films without having any bad influence, as mentioned above, on photographing and printing.

The inventors propose the following methods as a method of processing edges of a film or preventing the formation of edge fogging and studied the effectiveness thereof:

(1) a roullet is applied to narrow areas of the film near the edges thereof other than the image areas, (2) continuous or intermittent nicks or narrow grooves are formed in the narrow areas of the film other than the image areas, and (3) a solution or a dispersion containing a dye or a pigment capable of substantially preventing the transmittance of light (hereinafter, such a solution or dispersion is simply called ink) is introduced into the nicks or narrow grooves formed in above paragraph 2.

SUMMARY OF THE INVENTION

As a result of the investigation of the processing of films, prevention of the formation of the edge fog, and problems related to the travelling of films in cameras, it has been found that the method described in paragraph 3, above, is most effective and practical. That is, the inventors have found that the aforesaid object of this invention can be attained by forming nicks or fine grooves in the narrow areas of the surface of a film, other than image areas, and introducing into the nicks or grooves an ink capable of preventing the transmittance of light.

BRIEF DESCRIPTION OF THE DRAWING

The invention will be explained by referring to the accompanying drawings, in which.

DETAILED DESCRIPTION OF THE INVENTION

According to the present invention, the edge fog of photographic light-sensitive films is prevented effectively by forming continuously (FIG. 1 and FIG. 2) or intermittently (FIG. 3) nicks or narrow grooves in the light-sensitive emulsion layer surface or the back layer surface of a photographic light sensitive film in the narrow areas near the edges of the film and pouring into the nicks or the narrow grooves a solution or a dispersion containing a dye or a pigment capable of substantially preventing the transmittance of light to a light-sensitive region of the light-sensitive emulsion layer of the photographic film.

By the present invention, the transparency of the film base is not lowered. The number of the grooves or nicks and the number of the areas in which the nicks are formed are selected according to the kind of photographic light-sensitive films and hence there are no limitations thereto.

Figure 1:
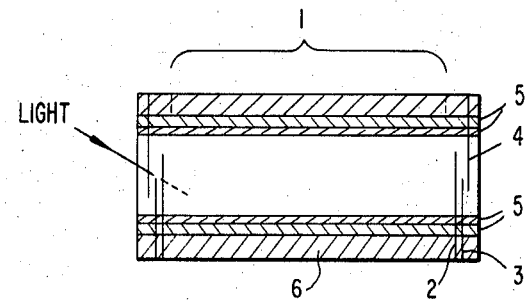
FIG. 1 is a cross sectional view of a photographic light-sensitive film of the present invention, showing the state of light entering the film support.

Now, in FIG. 1, the numeral 1 stands for an effective image area or an image area of a photographic light-sensitive emulsion layer formed on under coatings 5 of the photographic light-sensitive film. In the narrow area of the film near its edges there are formed nicks or narrow grooves 2, 3, and 4. Among them, nick 4 is formed from the light-sensitive emulsion layer side, while nicks 2 and 3 are formed from the side of back layer 6. As shown in FIG. 1, the entrance of light from the side section of the film is prevented by the ink present in the nicks or grooves.

Figure 2:
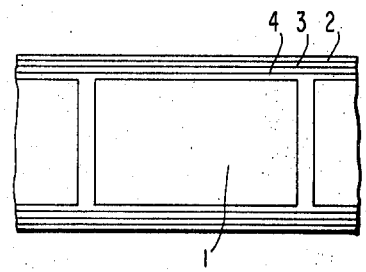
FIG. 2 and FIG. 3 are plane views, each showing an embodiment of the present invention.
Figure 3:
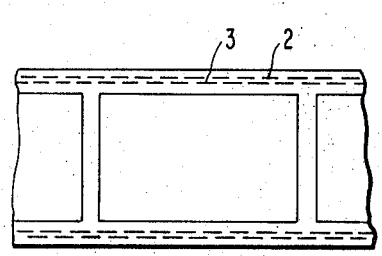

FIG. 2 shows an embodiment of this invention in which continuous nicks or grooves 2, 3 and 4 are formed in narrow side areas other than image area 1 and FIG. 3 shows other embodiments of this invention in which intermittent nicks or grooves are formed.

The photographic film in which nicks or grooves are formed and filled with ink, according to the process of this invention, is cut into definite lengths and packed in a spool or a magazine. In this case, even if the light enters the inside of the spool or magazine through the inlet thereof, a space between the flange of the spool and the film, or a space between the light-shielding paper and the film, the passage of the light through the film is prevented by being absorbed by the ink present in the nicks, whereby the formation of edge fog can be completely prevented.

As the supports for the photographic films used in the present invention, any suitable support may be used which has mechanical properties (in particular, a high bending strength), such as, polycarbonate and polyethylene terephthalate for forming nicks or grooves. In general, it is necessary that the depth of the nick or groove be one which leaves about 10 microns of thickness in the unnicked support layer. If the depth of the nick or groove is deeper than that, the mechanical strength of the film is reduced, and, hence, it is difficult to provide satisfactory photographic film.

The manner for forming nicks, the depth of the nick, the number of nicks, the shape of the nicks (continuous or intermittent, and the like), the plane where the nicks are formed, and the kind of the ink are influenced by the sensitivity of photographic film to be employed and the like. For example, it will be apparent that if the photographic film is a regular type, having a low sensitivity, the edge fog can be easily prevented according to the present invention.

Also, the inventors have found that after slitting a photographic film having a panchromatic emulsion layer, forming nicks in the areas near the edges of the film and other than the image area intermittently, two nicks from the light-sensitive emulsion layer side and two nicks from the back side alternately in a thickness of about ½ of the thickness of the film enables the formation of edge fog to be reduced to less than about ½ of that experienced with photographic film in which no such nicks are formed. That is, it is believed that in some kinds of light-sensitive films, edge fog can be prevented to a considerable extent by the formation of nicks without pouring the ink into the nicks.

Also, the kind of the ink used is particularly influenced by the spectral sensitivity of the photographic film in which the nicks are formed. Hence, a dye having an absorption in the spectral sensitivity range of the light-sensitive film may be used, but by using, for example, an ink prepared by dissolving a polymer binder into a solution of a dye having an absorption in the whole wave length range, the entrance of light can be sufficiently prevented for every photographic film.

As the dyes useful in the ink for the present invention, there are Oil Black NTD of C.I. No. 26150 (made by National Aniline Div. Allied Chemical & Dye Co.) and Sudan Black B (made by Farbenfabrik Wolfen), each having absorptions in the whole wave length range, or a desired combination of Organol Red B of C.I. No. 26105 (made by Compagnie Francais des Matieres Colorantes), Candle Scarlet (made by CIBA Ltd.), Organol Brilliant Blue (made by Co. Fran.), Oil Blue GA. of C.I. No. 61525 (General Dyestuff Co.), Seriton Fast Blue Green B (BASF A.G.), CIBA set Blue Green of C.I. No. 62500 (made by CIBA Ltd.), Seriton Fast Violet BA-CF (made by General Dyestuff Co.), and Seriton Fast Violet B of C.I. No. 62030 (BASF). But, other various dyes and combinations of other various dyes may be employed in the process of this invention. The above-illustrated dyes are soluble in organic solvents, such as, acetone, methylene chloride and the like. That is, it is naturally profitable to use a dye soluble in an organic solvent solution of a water-soluble dye dissolved in mixed solvents of water and methanol containing polyvinyl alcohol may also be used as the ink, or a dispersion of a pigment or a dye may be used.

As a binder for use in the ink of this invention, there are illustrated polyethyl methacrylate, vinyl chloride, nitrocellulose and the like.

The invention will now be explained practically by the following examples, in which parts are by weight.

EXAMPLE 1

A high-sensitivity panchromatic silver halide emulsion was applied to an under coated polyethylene terephthalate film to provide a photographic light-sensitive film. The film was slit to a definite width and by using a processing edge capable of forming nicks and, at the same time, pouring ink therein, nicks were formed at the positions of from 1–3 mm. from the opposite sides of the film, with two nicks formed from the back side and one nick from the emulsion layer side, in each edge, and, at the same time, an ink having the composition set forth below was poured in the nicks. At that, the depth of the nicks was ⅗ of the thickness of the film support, the thickness of the support being 84–100 microns. After drying the ink for one minute under a hot blast of 60° C., the photographic film was rolled up around a spool to provide a roll of film.

A roll of film was also prepared by using the same photographic film but having no nicks. When these two roll films are exposed to sun light for 5 minutes, fogs were formed even in image areas in the roll of film having no nicks, while no edge fog was formed in the image areas in the roll of film having the nicks, although the areas of the film outside the nicks were fogged.

The composition of ink used was as follows:

Liquid (1)

(A): Color Index No. 26105; Oilred RR (made by Orient Chemical Co.)

(B): Color Index No. 61525; Organo Blue G (made by Hodogaya Chemical Industry Co.)

(C): Color Index No. 62500; Estrol Fast Blue Green (made by Sumitomo Chemical Industry Co.)

(D): Color Index No. 62030; Estrol Fast Violet B. (made by Sumitomo Chemical Industry Co.).

A mixture of 7 g. of dye (A), 14 g. of dye (B), 24 g. of dye (C) and 3 g. of dye (D) was dissolved in one liter of methylene chloride.

Liquid (2)

Into one liter of a mixed solvent of 50% by weight methylene dichloride, 25% by weight acetone, 20% by weight ethylene dichloride, 3% by weight tetrachloroethane, and 2% by weight phenol was dissolved 40 g. of a copolymer of vinyl chloride and vinyl acetate, such as, Vinylite (VAGH) (made by Union Carbide Co.) as a binder to provide Liquid (2).

A mixed solution of 4 parts of Liquid (1) and 6 parts of Liquid (2) was called ink.

EXAMPLE 2

A high-sensitivity panchromatic silver halide emulsion was applied to an undercoated polycarbonate film to provide a photographic light-sensitive film. After slitting the film to a desired width, two nicks were formed in the positions 1–3 mm. apart from the opposite edges of the film, from the back side in a depth of about ⅔ of the thickness of the support. Also the following ink was poured therein at the same time, and was dried for one minute under a hot air blast of 60° C. The film was rolled up around a spool to provide a photographic film. From the film, a 16 mm. cinefilm was prepared and when the film was loaded in a camera in daylight by usual handling, no edge fog was formed.

The composition of ink was as follows:

Liquid (1): Same as in Example 1.

Liquid (2): Into one liter of a mixed solvent of 50% by weight acetone, 20% by weight methylene chloride, 15% by weight cyclohexane, 10% by weight tetrachloroethane and 5% by weight phenol was dissolved 40 g. of nitrocellulose (RS–20 made by Daicel Co.).

A mixture of 4 parts of liquid (1) and 6 parts of liquid (2) was used in this example as the ink.

EXAMPLE 3

A high-sensitivity panchromatic silver halide emulsion was applied to an undercoated polyethylene terephthalate film to provide a photographic film. After slitting to a definite width, two nicks were formed at the positions of 1–3 mm. from the opposite edges of the film from the back side thereof and one nick was formed from the emulsion layer side at positions between the emulsion layer side nicks, each nick having a depth of about ⅗ of the thickness of the support. Into the nicks were poured the following ink compositions (1) and (2) and the inks were dried for one minute under a hot air blast of 60° C. The photographic film was rolled up to provide a roll film. The same photographic film, but having no nicks, was prepared and rolled up to provide a roll of film. When they were exposed to the sun light, edge fog was formed partially throughout the film having no nicks, while no edge fog was formed in the image areas of the film having the nicks.

The ink compositions were as follows:

Ink composition (1)

Into 10 parts by weight of acetone was dissolved 2.5 parts by weight of a copolymer of styrene and maleic anhydride. Into the solution was added one part of carbon black to provide a dispersion. The dispersion was diluted with 30 parts of acetone to provide ink composition (1).

Ink composition (2)

Liquid (1): Parts
Polyethyl methacrylate _____ 10
Copolymer of terephthalic acid ethylene glycol and triethylene glycol _____ 5

The above mixture was dissolved in the following solvent mixture to provide liquid (1)

Parts
Methylene chloride _____ 95
Tetrachloroethane _____ 3
Phenol _____ 2

Liquid (2): Into 1000 parts of a mixed solvent of 1 part of methylene chloride and 1 part of acetone was dissolved 40 parts of C.I. No. 26150, Fat Black HB (Holckst) to provide Liquid (2).

Liquid (1) was mixed with liquid (2) in a mixing ratio of 6:4 to provide the ink.

What is claimed is:

1. A photographic light-sensitive film comprising a film support and at least one light-sensitive emulsion layer, said film having grooves at the opposite edge portions of the film and said grooves containing a coloring agent capable of preventing the transmittance of light to the light sensitive emulsion.

2. The film of claim 1 wherein said grooves are substantially continuous along the edges of said film.

3. The film of claim 1 where said grooves are in the form of a plurality of discrete nicks.

4. The film of claim 1 wherein said groove is to a depth which leaves at least about 10 microns of thickness in the un-grooved film support.

5. The film of claim 1 wherein coloring agent is a dye soluble in an organic solvent.

6. The film of claim 1 wherein said coloring agent is a dispersion of a pigment or dye.

7. The film of claim 1 wherein said coloring agent is carried in an organic binder.

References Cited

UNITED STATES PATENTS

| | | | |
|---|---|---|---|
| 886,673 | 5/1908 | Bianchi | 96—78 |
| 1,523,124 | 1/1925 | Jones | 96—78 |
| 1,665,481 | 4/1928 | Slocum | 96—78 |
| 2,335,746 | 11/1943 | Eckler | 96—78 |
| 3,379,605 | 4/1968 | Nerwin | 96—78 |

FOREIGN PATENTS

| | | | |
|---|---|---|---|
| 7,885 | 9/1970 | Great Britain | 96—67 |

RONALD H. SMITH, Primary Examiner

U.S. Cl. X.R.

96—67, 79, 84, 87